US007942162B2

(12) United States Patent
Torres

(10) Patent No.: US 7,942,162 B2
(45) Date of Patent: May 17, 2011

(54) TEE FLOW SPLITTER

(75) Inventor: Marlene H. Torres, Humble, TX (US)

(73) Assignee: National Tank Company, Houston, TX (US)

(*) Notice: Subject to any disclaimer, the term of this patent is extended or adjusted under 35 U.S.C. 154(b) by 256 days.

(21) Appl. No.: 12/013,619

(22) Filed: Jan. 14, 2008

(65) Prior Publication Data

US 2009/0178720 A1 Jul. 16, 2009

(51) Int. Cl.
*F16L 41/02* (2006.01)
*F16L 41/08* (2006.01)

(52) U.S. Cl. ............. 137/561 A; 285/133.11; 285/133.6

(58) Field of Classification Search ............. 137/561 A, 137/561 R; 285/131.1, 133.11–133.6
See application file for complete search history.

(56) References Cited

U.S. PATENT DOCUMENTS 3,319,650 A 5/1967 Peterson
3,643,689 A 2/1972 Isreeli et al.
3,794,056 A 2/1974 Warren
4,374,596 A 2/1983 Schlemmer et al.
4,391,551 A * 7/1983 Belcher ........................... 405/43
4,413,935 A 11/1983 Smith et al.
4,505,297 A * 3/1985 Leech et al. .............. 137/561 A
4,553,882 A 11/1985 Knappertz
5,099,879 A * 3/1992 Baird ........................ 137/561 A
5,474,102 A 12/1995 Lopez
5,879,029 A 3/1999 Wilks
5,944,261 A 8/1999 Heaslip et al.
6,065,782 A 5/2000 Allen, Jr.
6,182,699 B1 2/2001 Hawkes
D441,435 S 5/2001 Patteson et al.
D456,494 S 4/2002 Whitfield
6,576,029 B2 * 6/2003 West ............................... 55/349
2001/0011556 A1 * 8/2001 Butler ...................... 137/565.29
2003/0192598 A1 * 10/2003 Hobson et al. ............ 137/561 A
2005/0199293 A1 9/2005 Fulcher et al.

OTHER PUBLICATIONS

International Search Report and Written Opinion dated Feb. 20, 2009; issued by the International Searching Authority (ISA/US); Corresponding to PCT/US09/30803; 9 pages.
International Preliminary Report on Patentability issued by the International Bureau on Jul. 29, 2010 in PCT/US2009/030803 (6 pgs).

* cited by examiner

*Primary Examiner* — Stephen M Hepperle
*Assistant Examiner* — Atif H Chaudry
(74) *Attorney, Agent, or Firm* — Gable Gotwals

(57) ABSTRACT

A flow splitter that divides a two-phase (gas-liquid) inlet stream or a one-phase (liquid-liquid) inlet stream into equal and substantially balanced parts for distribution to an equal number of outlets horizontally oriented and connected to the flow splitter. Because of the design of the flow splitter, no control instrumentation or retention time is required during a split. Openings in each face of the flow splitter help to equalize pressure in the split and allow liquid to fill an end chamber that supports impact forces on a wedge-shaped spreader oriented with its leading edge toward an inlet stream.

7 Claims, 3 Drawing Sheets

TEE FLOW SPLITTER

REFERENCE TO PENDING APPLICATIONS

This application is not based upon any pending domestic or international patent applications.

FIELD OF THE INVENTION

This invention relates to an apparatus for splitting a two-phase (gas-liquid) stream or a one-phase (liquid-liquid) stream into a multiplicity of equal and substantially balanced streams.

BACKGROUND OF THE INVENTION

Flow splitters are well-known in such applications as hydrology, pulverulent material, and oil-and-gas handling and processing. In hydrology applications, the most common flow splitter device is a weir baffle. Weirs are used to divert water flow for further dilution and treatment and to separate a two-phase stream consisting of a liquid phase and a solid phase. Weirs are effective in these applications because the split of the liquid and solid phases is unlikely to become unbalanced.

Unbalanced flow is also not a concern in pulverulent material applications. In these applications, a flow splitter typically works by swirling a transport medium like air within the confines of a conical-shaped body such that the material entrained in the medium is distributed to various outlets disposed around the face of the conical-shaped body. Another flow splitter makes use of a v-shaped plug for distributing an inlet stream of pulverulent material to various outlets extending at an angle of less than 90 degrees to the inlet flow. This type of splitter is typical of flow splitters in general, requiring greater length relative to the diameter of the inlet stream, thereby increasing the footprint of the splitter.

In oil-and-gas applications, balancing the split of both phases of an input stream is important for safe, continuous operation. However, accurately dividing a two phase stream into an equal number of separate trains or pipelines is difficult and costly, requiring a downstream degassing vessel and elaborate instrumentation for subsequent splitting. Additionally, it is extremely difficult—if not impossible—to balance the split of both phases of the inlet stream. This imbalance presents an increased risk of failure, especially during slugging operations.

One standard splitting approach used in oil-and-gas applications involves piping the inlet stream into two symmetrical pipelines, each of which connects to a downstream degassing vessel. Although the two flow paths are symmetrical, the gas phase of the split can become unbalanced due to vortex flow in the piping just ahead of the split, the rheological properties of the stream, and the geometric complexities of the equipment involved. This unbalanced gas flow can overload one of the degassing vessels.

A second standard approach pipes the inlet stream into a degassing vessel that contains outlets leading to symmetrical pipelines and processing vessels. This approach, however, requires controlling inlet stream momentum, stream retention time, and outlet flow. The gas phase of this split also can become unbalanced for the same reasons as the first approach above. Variations of this second approach—all of which fail to equalize the loads before splitting—include placing a weir baffle inside a degassing vessel to split the inlet stream into two compartments which, in turn, are split into two pipes. The two phases are then recombined at the outlet side with the liquid phase flow rate controlled through an adjustable valve.

A third standard approach employs a centrifugal separator inlet device that consists of pairs of cylindrical tubes connected by a manifold to a vessel inlet nozzle. A stream enters the tubes tangentially, creating centrifugal force that causes stream separation by spinning the liquid phase of the stream outward against the walls of the tubes. While this approach controls inlet stream momentum by redirecting the stream and dissipating its energy, it is costly and requires a relatively large footprint to implement.

A need exists, therefore, for a flow splitter that eliminates the use of expensive control instrumentation, controls inlet momentum and impact forces, eliminates unbalanced load in outlet streams, and reduces cost, footprint area, and weight relative to standard degasser installations. None of the prior art alone or in combination meets this need or renders the present invention obvious.

For additional information relating to flow splitters, reference may be had to the following previously issued United States patents.

| Patent Number | Inventor | Title |
|---|---|---|
| D456494 | Whitfield | Recreation Vehicle Diverter Hose/Faucet |
| D441435 | Patteson et al | Universal Hose Connector |
| 3,319,650 | Peterson | Construction For Y-Shaped Valves, Couplings Or The Like |
| 3,643,689 | Isreeli et al. | Fluid Distribution Manifold |
| 3,794,056 | Warren | Fluidic Pulse and Flow Divider |
| 4,374,596 | Schlemmer et al. | Pipe-Form Connector For Cable Ducts |
| 4,413,935 | Smith et al. | Flow Splitter For Dividing A Stream Of Pulverulent Material Into Multiple Streams |
| 4,553,882 | Knappertz | Method and Apparatus For Pneumatically Conveying Fiber Material |
| 5,474,102 | Lopez | Fluid Distribution Manifold |
| 5,879,029 | Wilks | Water Hose System |
| 6,065,782 | Allen Jr. | Pipe Joint Support Device |
| 6,182,699 | Hawkes | Diverter Valve For Improved Flow Control |
| 2005/0199293 | Fulcher et al. | Manifold For Selectively Dispersing Multiple Fluid Streams |

BRIEF SUMMARY OF THE INVENTION

A flow splitter according to this invention applies momentum control to divide a two-phase (gas-liquid) inlet stream, or to divide a one-phase (liquid-liquid) stream, into equal and substantially balanced parts for distribution to an equal number of outlets horizontally oriented and connected to the splitter. Because of the design of the flow splitter, no control instrumentation or retention time is required during a split.

The flow splitter comprises a manifold having an open inlet end, a closed end, at least two opposing and substantially equally sized outlet openings, and a wedge-shaped spreader housed within the manifold. The leading edge of the spreader is substantially at a right angle to the outlets, and the two faces of the spreader create substantially the same horizontal deflection angle to those outlets. Openings in each face of the splitter help to equalize pressure in the split and allow liquid to fill an end chamber that supports impact forces on the spreader. Vent and drain connections provide for maintenance of the flow splitter.

A better understanding of the invention will be obtained from the following detailed description of the preferred embodiments taken in conjunction with the drawings and the attached claims.

BRIEF DESCRIPTION OF THE DRAWINGS

Preferred embodiments of the invention will now be described in further detail. Other features, aspects, and advantages of the present invention will become better understood with regard to the following detailed description, appended claims, and accompanying drawings (which are not to scale) where:

DETAILED DESCRIPTION OF THE PREFERRED EMBODIMENTS

It is to be understood that the invention that is now to be described is not limited in its application to the details of the construction and arrangement of the parts illustrated in the accompanying drawings. The invention is capable of other embodiments and of being practiced or carried out in a variety of ways. The phraseology and terminology employed herein are for purposes of description and not limitation.

Figure 1:
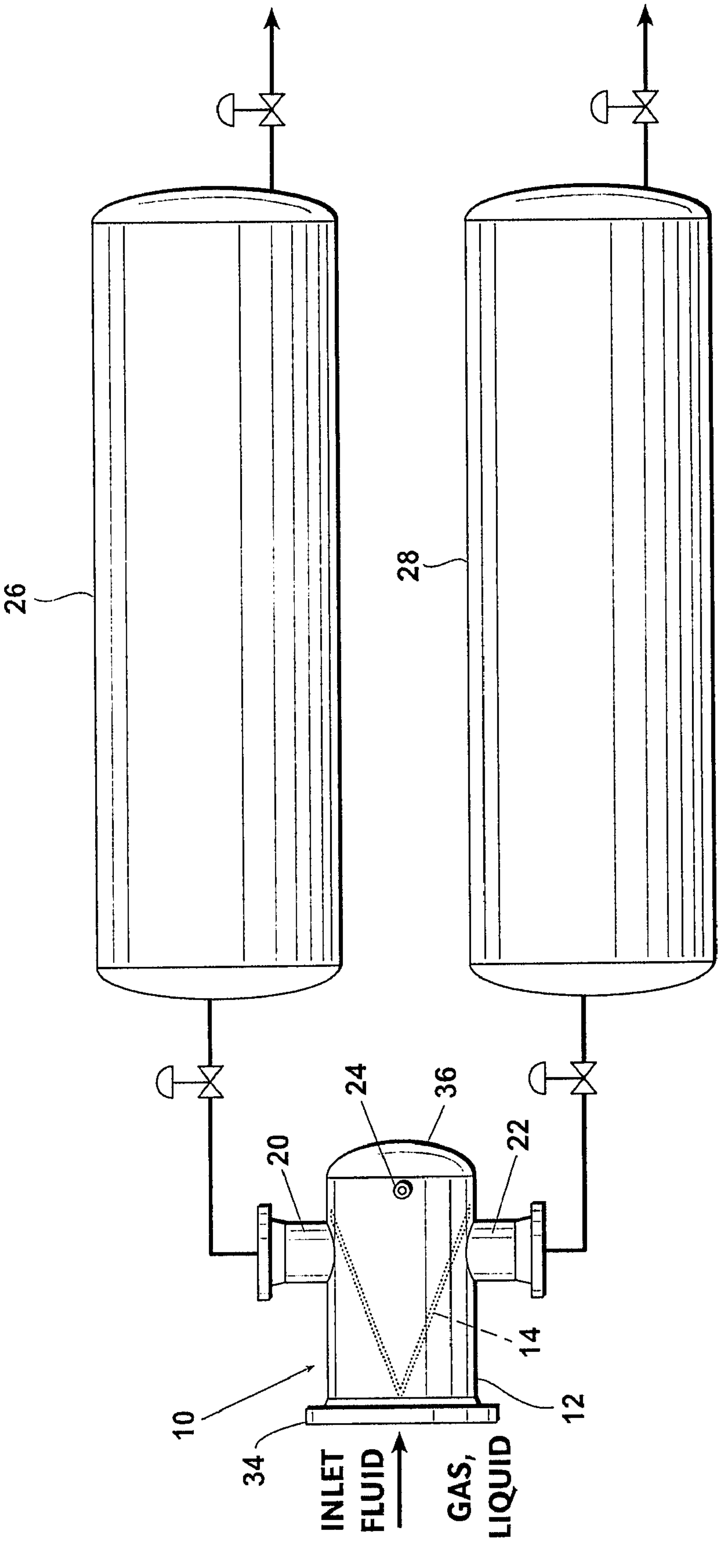
FIG. 1 is a top view of the tee flow splitter connected to downstream separation vessels.

Elements shown by the drawings are identified by the following numbers:

10 Tee flow splitter
12 Manifold
14 Spreader
16 Left Split Chamber
18 Right Split Chamber
20 Left Outlet Pipe
22 Right Outlet Pipe
24 Vent
26 Left Separation Vessel
28 Right Separation Vessel
30 Spreader Top Hole
32 Spreader Bottom Hole
34 Flange
36 Head
38 End Chamber
40 Drain Referring to the drawings and first to FIG. 1, a tee flow splitter 10 comprises a manifold 12 with a flange connection 34 on its inlet side, an elliptical-shaped head 36 opposite the inlet side, and two equally-sized and opposing outlet openings to which a left horizontal outlet pipe 20 and right horizontal outlet pipe 22. The left 20 and right 22 horizontal pipes are then connected to a left separation vessel 26 and a right separation vessel 28 respectively. Each horizontal outlet pipe 20, 22 is located toward the end of a wedge-shaped spreader 14 housed within the manifold. Each face of the spreader 14 is oriented at substantially the same horizontal angle relative to a centerline of the manifold 12 and function to divide an inlet stream into substantially equal parts. The exact location of the outlet openings in the manifold 12 relative to the end of the spreader 14, as well as the size of the outlet openings, can vary depending on a desired percent distribution of a split inlet stream to the pipes 20, 22. A vent 24 is located at the top of the manifold to provide for maintenance.

In a functional prototype of the tee flow splitter 10—which was designed to split a two-phase (liquid-gas) inlet stream into two equal parts and deliver half of the flow to each of two horizontal outlet pipes—a 30 inch outside diameter cylinder, ⅜ inch thick and 4 feet in length was used for the manifold 12. The inside diameter of the manifold 12 was substantially twice that of the inside diameter of the left 20 and right 22 horizontal outlet pipes. The elliptical-shaped head 36 had an outside diameter equal to that of the manifold 12. The spreader 14 was constructed of two plates welded together; each plate extended in height substantially equal to that of the inside diameter of the manifold 12 and extended in length substantially equal to that of the manifold 12. Each plate then tapered along the length of its top and bottom edges to form an elliptical-shaped end (see FIG. 4). The functional prototype had a design and maximum allowable working pressure of 100 PSIG, an operating pressure of 35 PSIG, a hydrotest pressure of 130 PSIG, a minimum design metal temperature of −20° F., and design, operating, and hydrotest temperatures of 150° F., 105° F., and 70° F. respectively. No retention time or flow control instrumentation was required to split the two-phase stream.

Figure 2:
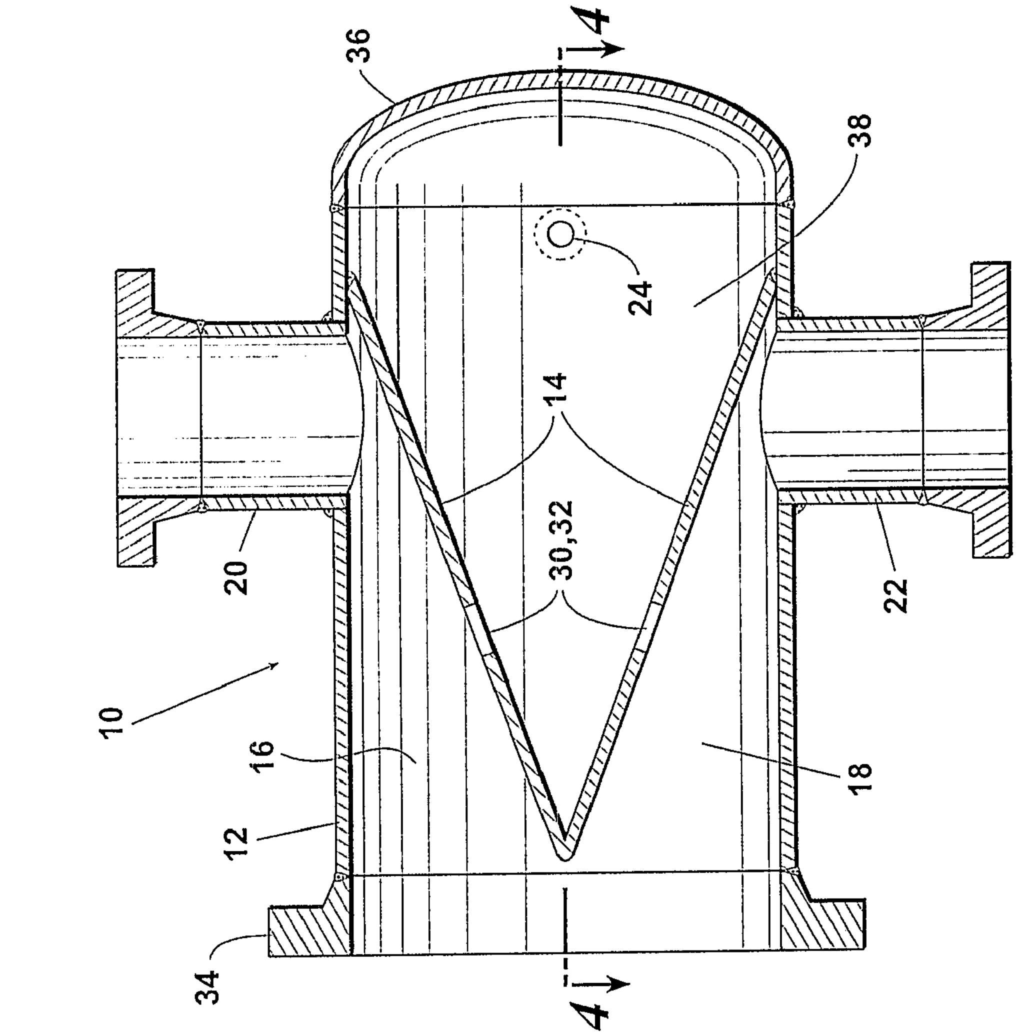
FIG. 2 is a sectional, top view of the tee flow splitter.

As shown in FIG. 2, the geometry of the spreader 14 combines with that of the manifold 12 and the head 36 to form three chambers: a left split chamber 16, a right split chamber 18, and an end chamber 38. The spreader 14 is oriented such that its leading edge is substantially at a right angle to the horizontal outlet pipes 20, 22. An inlet stream carried by an inlet pipe enters the manifold 12 and hits the spreader 14 tangentially, thereby splitting the stream into two substantially equal parts, with one part distributed to the left split chamber 16, the other part distributed to the right split chamber 18. Each face of the splitter 14 contains a top hole 30 and a bottom hole 32 that deliver liquid from the inlet stream to the end chamber 38 and help maintain substantially even pressure in the left 16 and right 18 split chambers. Because the end chamber 38—which is formed by the spreader 14 and the elliptical-shaped head 36—fills with liquid, the end chamber 38 keeps a constant weight to the spreader 14, supporting the spreader 14 against impact forces of the inlet stream, especially during surges in the inlet stream.

Figure 3:
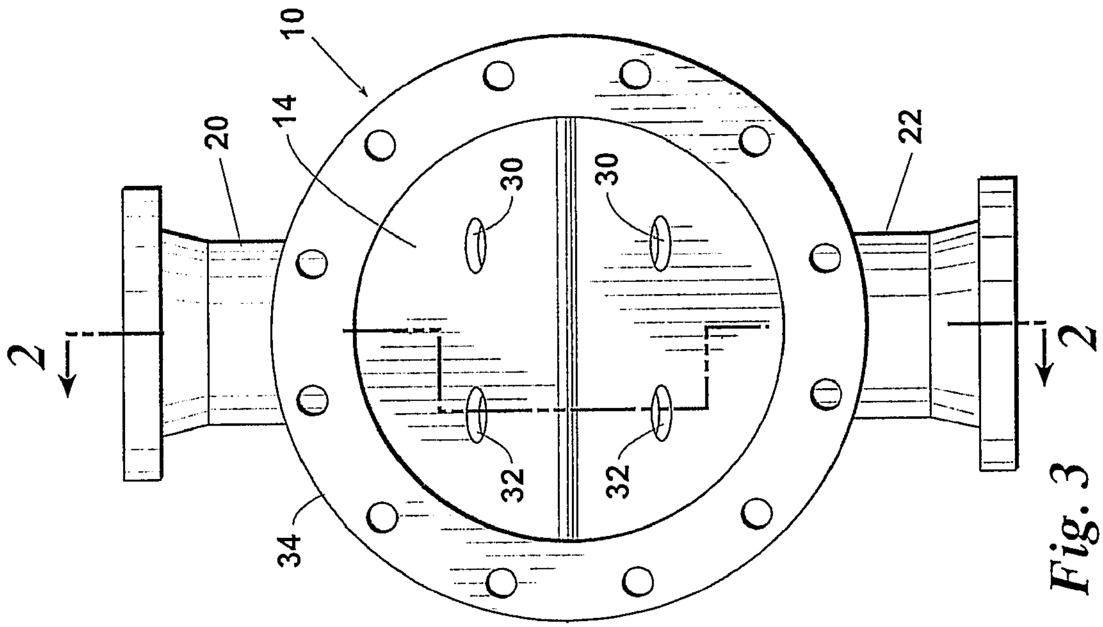
FIG. 3 is a side view of the tee flow splitter as viewed from its open inlet side.

FIG. 3 depicts the top hole 30 and the bottom hole 32 located in each face of the spreader 14. As mentioned above, these holes deliver liquid to the end chamber 38 and help maintain substantially even pressure in the left 16 and right 18 split chambers. In the functional prototype of the tee flow splitter 10, the top hole 30 and the bottom hole 32 were 2 inches in diameter. The center of each top hole 30 was located, at least substantially, at half the horizontal face length of the spreader 14, halfway between a horizontal center line of the face and its top edge. (See also FIG. 4.) The center line of each bottom hole 32 was located, at least substantially, at half the horizontal face length of the spreader 14, halfway between a horizontal center line of the face and its bottom edge. The number of holes, hole sizes, and hole locations will vary according to the impact forces experienced by the spreader 14.

Figure 4:
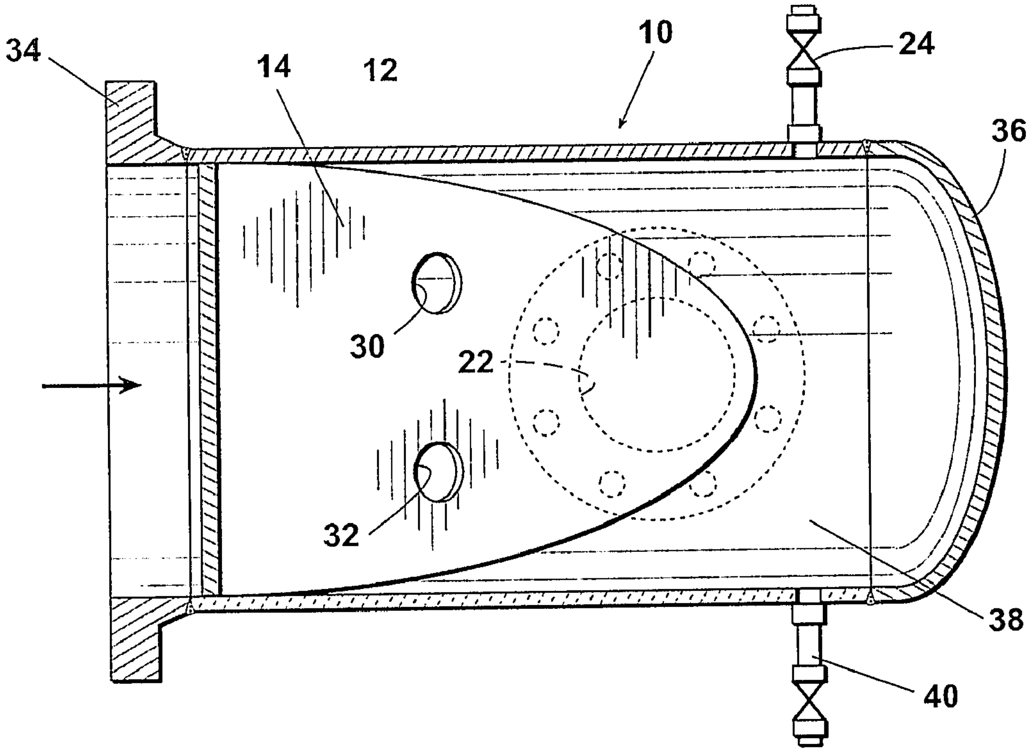
FIG. 4 is a sectional, front view of the tee flow splitter.

FIG. 4 shows the elliptical shape of the right face of the spreader 14, the locations of the top hole 30 and the bottom hole 32, and the location of the spreader 14 relative to the outlet opening and the elliptical-shaped head 36. The vent 24 and a drain 40 provide for maintenance. In the functional prototype of the tee flow splitter 10, a small diameter vent 24 and an equal size drain 40 were used.

Figure 5:
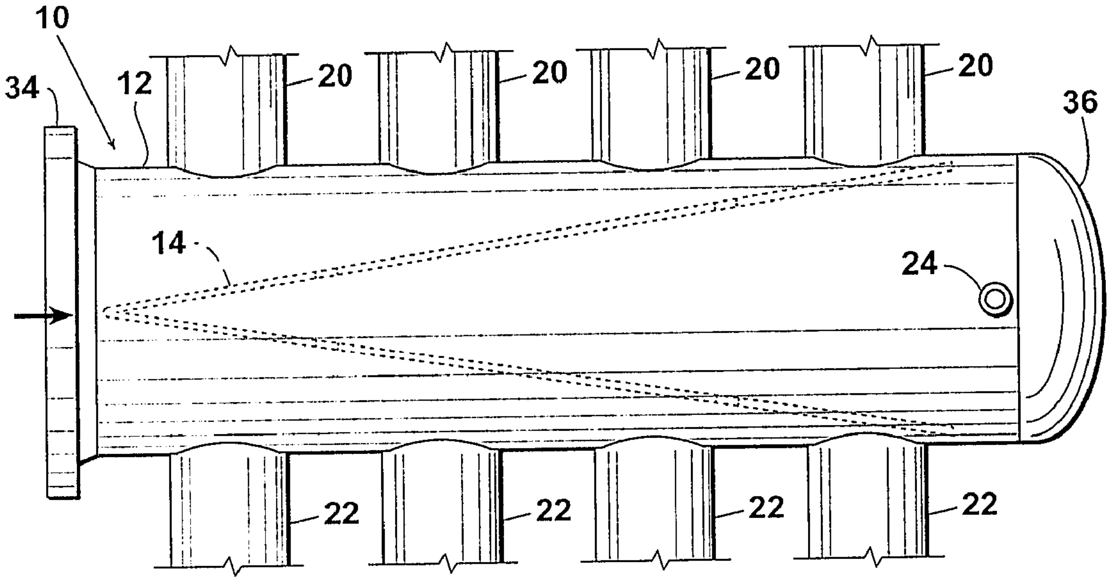
FIG. 5 is a top view of the tee flow splitter showing multiple outlet connections.

FIG. 5 shows an arrangement of the tee flow splitter 10 with several opposing and substantially equal in size horizontal outlet pipes connected to it. While four left horizontal outlet pipes 20 and four right horizontal outlet pipes 2 are shown, any number of even-numbered splits can be used (e.g., 2, 4, 6, 8). Another application of the tee flow splitter 10 is to use as many splitter units as needed to split the inlet stream into a series of even numbers. For example, a first tee flow splitter 10 can be connected to two downstream tee flow splitters 10. Depending on the desired number of splits, each of the two downstream tee flow splitters 10 can be connected to a left 26 and right 28 separation vessel, or each splitter 10 can be connected to another set of downstream tee flow splitters 10.

While the invention has been described with a certain degree of particularity, it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claims, including the full range of equivalency to which each element thereof is entitled.

What is claimed is:

1. A flow splitter for use in dividing into equal and substantially balanced parts a two-phase (gas-liquid) inlet stream or a one-phase (liquid-liquid) inlet stream, said flow splitter comprising:

a horizontally oriented manifold having an open inlet end, a closed end, at least two opposing radially extending and substantially equally sized outlet openings each communicating with an oppositely extending horizontally arrayed outlet pipe and a wedge-shaped spreader housed within said manifold between said outlet openings;

said spreader having a leading edge and two opposing, substantially equally sized faces, said faces being contiguous to each other at said leading edge, said leading edge being vertically oriented along a center line of said manifold and toward said open inlet end, said faces each being oriented at substantially the same deflection angle;

said spreader extending in height at least substantially equal to the inside diameter of said manifold at said leading edge, said spreader extending in length from adjacent said open inlet end to beyond a portion of said outlet openings;

said spreader forming an end chamber and substantially equal and opposing split chambers, said faces of said spreader each having at least one opening for providing fluid communication between said split chambers and said end chamber so that said end chamber fills with fluid and supports said spreader against impact forces exerted on said spreader by said inlet stream and maintains substantially even pressure in said split chambers; and wherein said manifold further includes at least one vent connection communicating with said end chamber.

2. A flow splitter according to claim 1 wherein said manifold is further comprised by an inside area of at least twice that of the inside area of said outlet openings.

3. A flow splitter according to claim 1 wherein said split chambers are substantially formed by said faces and opposing inside wall portions of said manifold.

4. A flow splitter according to claim 1 wherein said outlet openings are each oriented at substantially a 90 degree angle relative to a vertical plane of said spreader leading edge.

5. A flow splitter according to claim 1 wherein said manifold closed-end is elliptical shaped.

6. A flow splitter according to claim 1 wherein said end chamber is substantially formed by an inside wall portion of said faces and said manifold closed-end.

7. A flow splitter according to claim 1 wherein said manifold further includes at least one drain connection.

* * * * *